(12) United States Patent
Miao et al.

(10) Patent No.: US 8,050,229 B2
(45) Date of Patent: Nov. 1, 2011

(54) APPARATUS AND METHOD OF IP MOBILITY MANAGEMENT FOR PERSISTENT CONNECTIONS

(75) Inventors: Yu-Ben Miao, Tainan (TW); Tai-Xing Yu, Tainan (TW); Jing-Shyang Hwu, Kaohsiung (TW); Ce-Kuan Shieh, Tainan (TW); Tzu-Chi Huang, Tainan (TW); Bo-Yang Lai, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 562 days.

(21) Appl. No.: 11/694,994

(22) Filed: Mar. 31, 2007

(65) Prior Publication Data

US 2008/0137611 A1 Jun. 12, 2008

(30) Foreign Application Priority Data

Dec. 7, 2006 (TW) .............................. 95145658 A (51) Int. Cl.
*H04W 4/00* (2009.01)
(52) U.S. Cl. ........ 370/331; 455/436; 455/439; 455/445; 455/452.2; 370/338
(58) Field of Classification Search .................. 370/331, 370/477, 237, 338; 455/445, 452.2, 574, 455/411, 436
See application file for complete search history.

(56) References Cited

U.S. PATENT DOCUMENTS

| | | | |
|---|---|---|---|
| 2005/0286504 A1 | 12/2005 | Kwon | |
| 2006/0009213 A1* | 1/2006 | Sturniolo et al. | 455/426.1 |
| 2007/0072605 A1* | 3/2007 | Poczo | 455/432.2 |
| 2007/0140189 A1* | 6/2007 | Muhamed et al. | 370/338 |
| 2009/0303962 A1* | 12/2009 | Jokikyyny et al. | 370/331 |

FOREIGN PATENT DOCUMENTS

WO   WO 01/31472   5/2001

\* cited by examiner

*Primary Examiner* — Kamran Afshar
*Assistant Examiner* — Shahriar Behnamian (57) ABSTRACT

The present invention is directed to an apparatus and method for IP mobility management for persistent connections. Without affecting the applications on the network domain, it provides for domain hand-off for a mobile node so that the mobile node can maintain the persistent connection. The mobility management apparatus may comprise a Mobility-Aware Socket module (MAS) and one or more mobility management servers. Each mobility management server communicates with a corresponding mobile node. When a mobile node roams from a first network domain to a second network domain, the mobile node and its target mobile nodes execute the MAS module to support the mobility management for persistent connections through their corresponding mobility management servers.

18 Claims, 9 Drawing Sheets

| USED | HA | CoA | NEED TRANSLATE | TTL |
|------|----|----|----------------|-----|

APPARATUS AND METHOD OF IP MOBILITY MANAGEMENT FOR PERSISTENT CONNECTIONS

FIELD OF THE INVENTION

The present invention generally relates to an apparatus and method of Internet Protocol (IP) mobility management for persistent connections.

BACKGROUND OF THE INVENTION

As the wireless network, such as 802.11/WLAN, 802.16/WiMAX, is widely available in the public network and enterprise network, the use of wireless network to provide packet switching voice, voice over IP, or multimedia services has become an inexpensive and convenient option for personal mobile communication.

The wireless network system is usually based on IP, and provides wireless network access through the extension of wireless network access point/base station. The core network includes one or more servers for assisting in establishing connections. The connections can be voice, video, or multimedia. The mobile node can communicate with the node in the internet.

However, the development of conventional applications was usually based on a fixed network, and rarely took the wireless network environment into account. For mobile nodes, the application usually assumes the operation in a wired network. When a mobile node switches between different networks, the application will change IP address because of the network interface switch or network environment change. That is, when a mobile node moves out of the home network into a foreign network, the mobile node must obtain a new IP address from the foreign network, which causes the interruption of the original connection.

If an internet application does not take the mobility management in a wireless network into account, the original connection may be interrupted when the mobile node switches between different networks. In this case, the user is required to re-establish the connection, or modifies/replaces application to support mobility management.

WIPO Patent No. WO0131472 disclosed a mobility management protocol for the third generation internet protocol (3G-IP) to support the real time and non-real time multimedia application on mobile nodes. The technology adopts and extends the Session Initiation Protocol (SIP) to provide the macro mobility of domain hand-off and sub-net hand-off so that a user can use the mobile node for network access at any place when the user is roaming in different 3G-IP networks.

This technology also supports transmission control protocol (TCP) application with mobility without changing TCP protocol. When a mobile node moves, the INVITE and INFO of SIP are used for IP binding and user identification. The REGISTER of SIP is used for obtaining a new IP address from dynamic host configuration protocol (DHCP) server. In the mean time, an agent called SIP_EYE is used for maintaining the TCP connection on the mobile platform.

This technology disclosed in the patent document supports SIP-based applications, but provides no solutions for general application. Also, when both ends of the 3G-IP environment are mobile nodes, this technology may not support simultaneous mobility.

SUMMARY OF THE INVENTION

The examples of the present invention may provide an apparatus and method of IP mobility management for persistent connections. The present invention allows a mobile node to maintain the original connection without interruption when switching between different network domains, and prevents the application on the mobile node from being affected by the domain switching.

The apparatus of mobility management for persistent connection comprises a plurality of mobility management servers responsible for communicating with mobile nodes, and a Mobility-Aware Socket (MAS) module. Each mobility management server is responsible for communicating with the corresponding mobile node. When a mobile node roams from a domain to another domain, the mobile node and the target mobile node for connection execute the MAS module respectively, and the corresponding mobility management servers accomplish the supporting of persistent connection for the mobile nodes in different domains.

The process for supporting persistent connection of mobile nodes in different domains includes registering to the mobility management server, issuing invitation message to the target mobile node, establishing the connection between the mobile node and the target mobile node, switching domain, updating registration, issuing re-invitation message, and connecting the original connection of the mobile node and the target mobile node.

In the present invention, the state of the MAS module in a mobile node can change from NO-CONNECTION to INVITE, from INVITE to INVITE-SUCCESS, from INVITE to INVITE-FAILURE, from INVITE-SUCCESS to RE-INVITE, from RE-INVITE to INVITE-SUCCESS, from RE-INVITE to INVITE-FAILURE, and from INVITE-FAILURE to INVITE-SUCCESS.

Without loss of generality, in an embodiment of the present invention, the MAS module is applied to a SIP-based network to describe how the persistent connections are maintained when a mobile node switches to a different domain.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
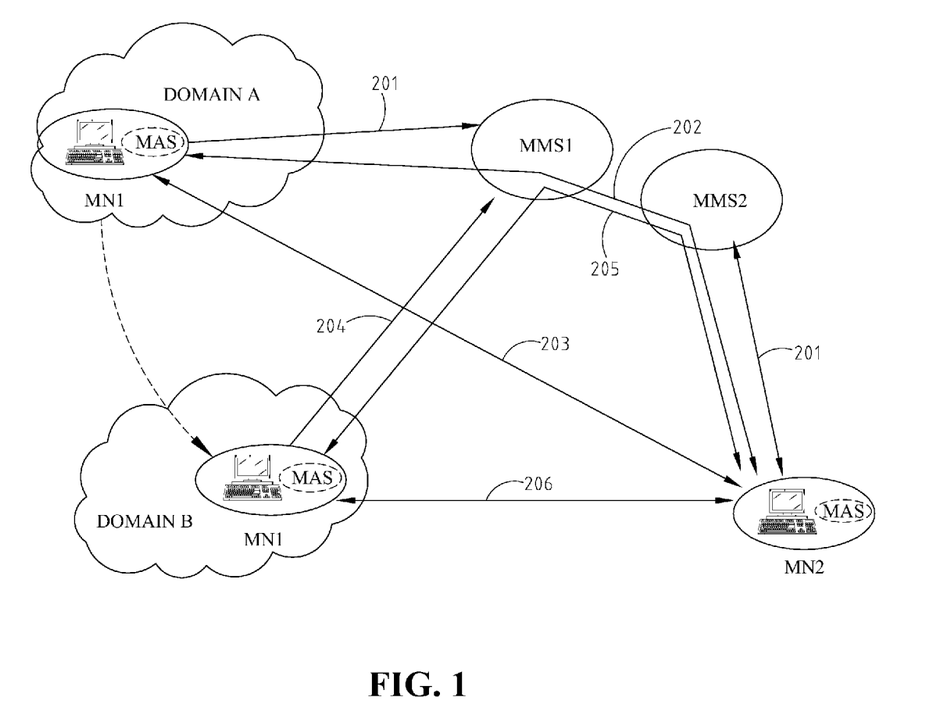
FIG. 1 shows a schematic view of an apparatus of IP mobility management for persistent connections of the present invention applied to a wireless network.

FIG. 1 shows a schematic view of an apparatus of IP mobility management for persistent connections of the present invention applied to a wireless network environment. The wireless network environment includes a plurality of mobile nodes in a plurality of domains. Without loss of generality, FIG. 1 shows a mobile node MN1 in domain A and a mobile node MN2 in a different domain, and mobile nodes MN1 and MN2 are already connected. Mobile nodes MN1, MN2 can be a notebook PC, PDA, mobile phone, and so on.

Referring to FIG. 1, the apparatus of IP mobility management for persistent connections comprises one or more mobility management servers responsible for communicating with the mobile devices, and an MAS module. Mobility management servers MMS1 and MMS2 are responsible for communicating with mobile nodes MN1 and MN2, respectively. When mobile node MN1 switches from domain A to domain B, mobile nodes MN1 and MN2 execute the MAS module respectively, and mobility management servers MMS1 and MMS2 use the steps 201-206 of FIG. 2 to accomplish the process of supporting persistent connection between mobile nodes MN1 and MN2 in different domains.

Figure 2:
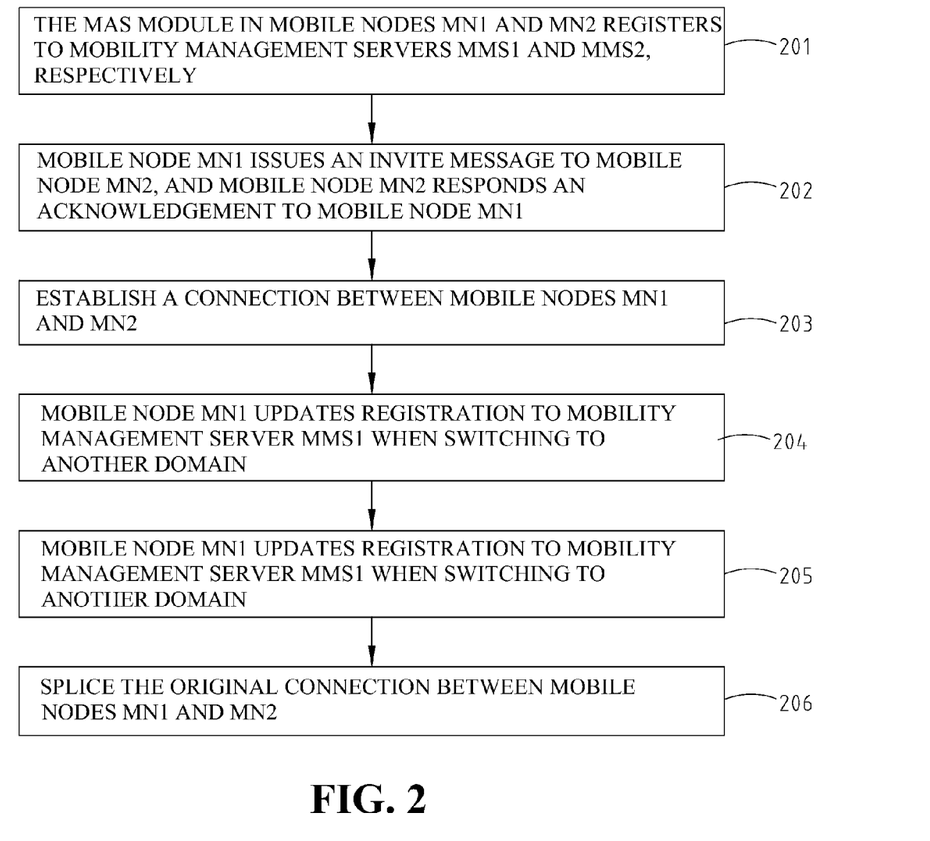
FIG. 2 shows a flowchart illustrating the IP mobility management process of supporting persistent connection.

The following description refers to FIG. 1 and FIG. 2, where FIG. 2 shows a flowchart illustrating the mobility management process of supporting persistent connection.

Step 201 is for the MAS module in mobile nodes MN1 and MN2 to register to mobility management servers MMS1 and MMS2, respectively. The MAS module uses the public IP of mobile nodes MN1 and MN2 as the home address (HA), and uses the HA and domain name as the URL to register to mobility management servers MMS1 and MMS2, respectively. During the registration, the MAS module informs mobility management servers MMS1 and MMS2 of the HA and the port used when connecting to the mobility management server to complete the registration.

Step 202 is for mobile node MN1 to issue an INVITE message to mobile node MN2, and mobile node MN2 responds with an acknowledgement to mobile node MN1. The MAS module of mobile node MN1 issues an INVITE message through mobility management servers MMS1 and MMS2 to mobile node MN2, and mobile node MN2 responds through mobility management servers MMS1 and MMS2 to mobile node MN1 with an acknowledgement.

Step 203 is to establish a connection between mobile nodes MN1 and MN2.

Step 204 is for mobile node MN1 to update registration to mobility management server MMS1 when switching to another domain. In FIG. 1, when mobile node MN1 switches from domain A to domain B, the MAS module of mobile node MN1 obtains a new IP address as the care of address (CoA) from the dynamic host configuration protocol (DHCP). The CoA is used as the contact address of URL specified in step 201. The MAS module informs mobility management server MMS1 of the new IP of mobile node MN1 and the port used for connection to complete the update of registration.

Step 205 is for mobile node MN1 to issue another INVITE message to mobile node MN2, and mobile node MN2 responds with an acknowledgement to mobile node MN1. The MAS module of mobile node MN1 issues an INVITE message through mobility management servers MMS1 and MMS2 to mobile node MN2, and mobile node MN2 responds through mobility management servers MMS1 and MMS2 to mobile node MN1 with an acknowledgement.

Step 206 is to splice the original connection between mobile nodes MN1 and MN2.

Figure 3:
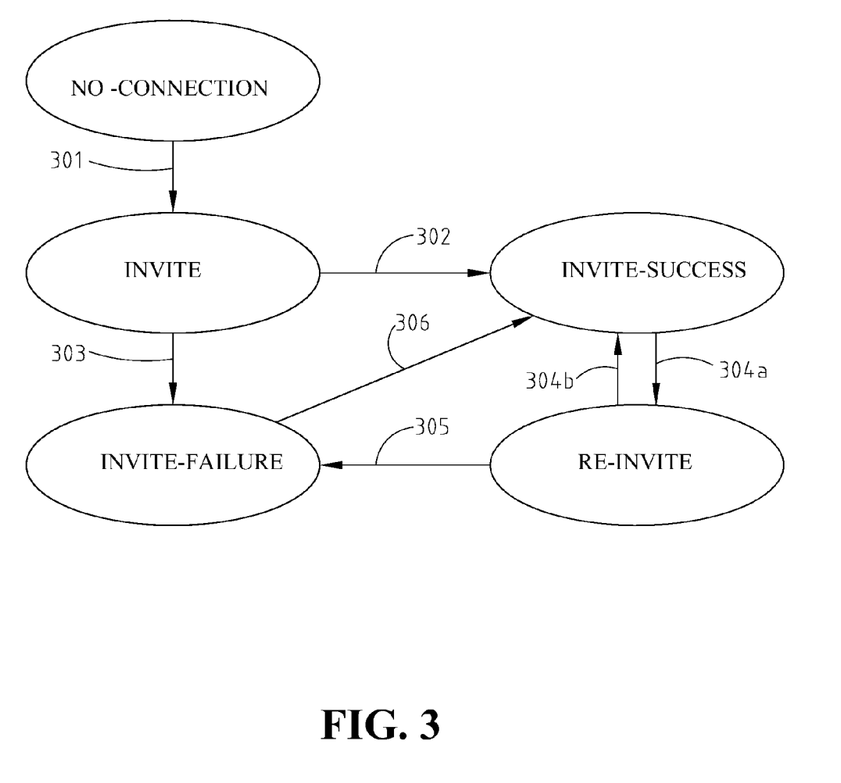
FIG. 3 shows a finite state machine of an MAS module in a mobile node.

FIG. 3 shows a finite state machine of an MAS module in a mobile node. The mobile node MN1 is used for explanation in FIG. 3. When mobile node MN1 intends to connect to a target mobile node, for example, mobile node MN2, the MAS module issues an INVITE message, and the state changes from NO-CONNECTION to INVITE, marked as 301. If the invitation is successful, the state changes from INVITE to INVITE-SUCCESS, marked as 302; otherwise, the state changes from INVITE to INVITE-FAILURE, marked as 303.

If mobile node MN1 switches to another domain, mobile node MN1 is required to issue another INVITE message to the connected mobile node MN2. Therefore, the state of the MAS module will change from INVITE-SUCCESS to RE-INVITE, marked as 304a. If the re-invitation is successful, the state returns from RE-INVITE to INVITE-SUCCESS, marked as 304b; otherwise, the state changes from RE-INVITE to INVITE-FAILURE, marked as 305.

It is worth noting that during mobile node MN1 inviting mobile node MN2, if the network fails, mobile node MN2 is turned off, or mobile node MN2 is roaming and yet to obtain a CoA, the state of the MAS module will change to INVITE-FAILURE. In the INVITE-FAILURE state, if mobile node MN2 is connected to the network, MN2 will issue a re-invitation, and the MAS module of mobile node MN1 will change from INVITE-FAILURE to INVITE-SUCCESS, marked as 306. Therefore, for mobile node MN1, the state changes marked as 301-305 are active, and the state change marked as 306 is passive.

Figure 4:
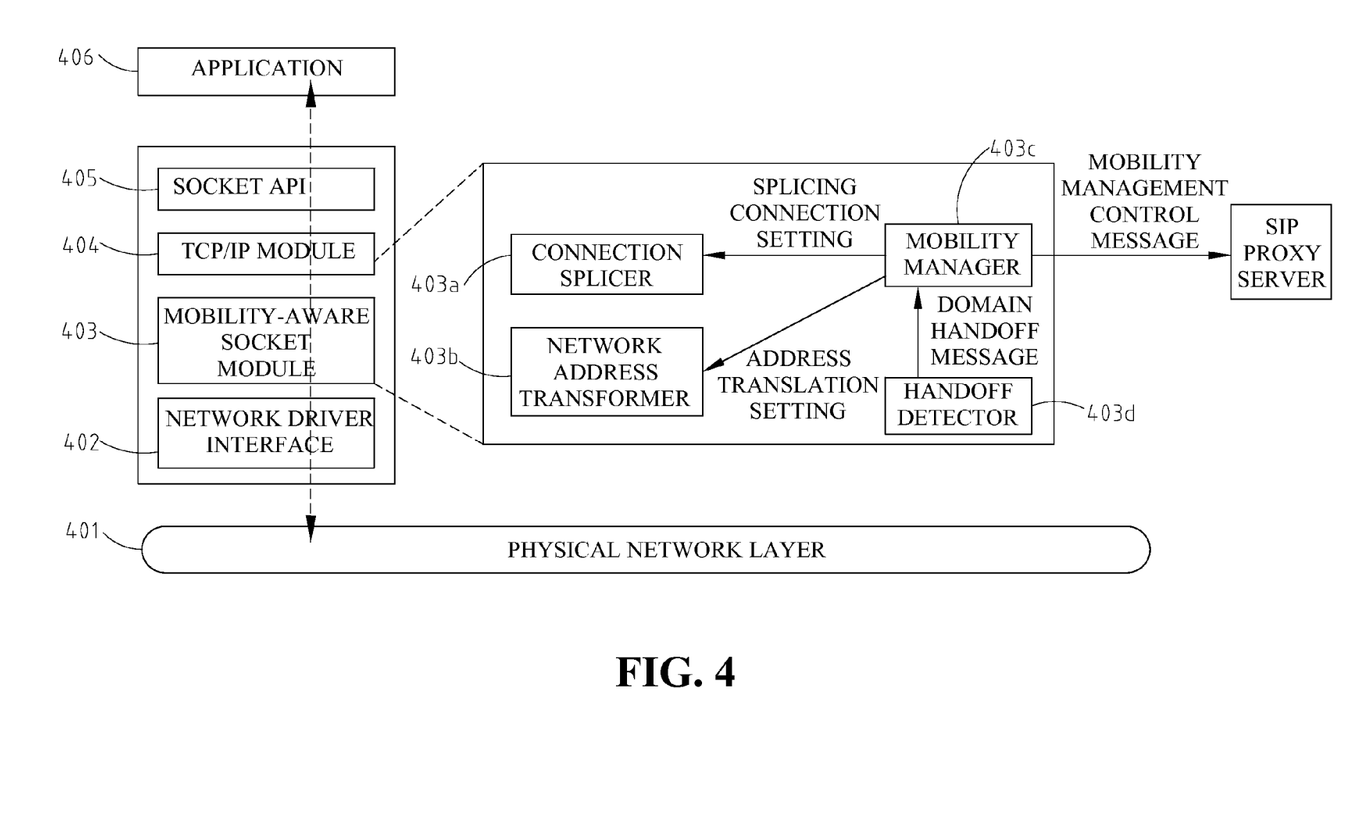
FIG. 4 shows a schematic view of a working example of the MAS module applied to a SIP-based TCP connection.

FIG. 4 shows a schematic view of a working example of the MAS module applied to a SIP-based TCP connection.

As shown in FIG. 4, the MAS module 403 further includes a connection splicer 403a, a network address transformer 403b, a mobility manager 403c, and a handoff detector 403d. The SIP-based network environment at least includes a physical network layer 401, a network driver interface 402, the MAS module 403, TCP/IP module 404, a socket API 405, and an application 406 of the user interface. The MAS module 403 is located between the network driver layer 402 and the TCP/IP protocol 404.

During the roaming of a mobile node, the mobile node is in the state of losing connection. For a TCP connection, the operating system (OS) will re-send the un-acknowledged packets. If the re-sending time exceeds the limit, the OS will terminate the TCP connection. When the roaming mobile node re-connects to the network, the TCP connection is disconnected, and the original connection cannot be returned to. Therefore, it is important to maintain TCP connection.

The SIP proxy server of FIG. 4 is the working example of MMS of FIG. 1. The mobile nodes MN1 and MN2, through mobility manager 403c of MAS module 403, issue mobility management control signals to SIP proxy servers for registration, invitation and establishing connection. The MAS module 403 receives the data packets from the network driver interface 402, and executes the support of mobility management for persistent connection.

When MN1 roams from domain A to domain B and obtains a new IP as the CoA, the handoff detector 403d detects the switching of domain by the mobile node MN1, and issues a domain handoff acknowledgement to the mobility manager 403c. The mobility manager 403c issues a connection splice signal to the connection splicer 403a, an IP address transformation signal to the network address transformer 403b, and a mobility management control signal to the external SIP proxy server, respectively. Therefore, even if the mobile node MN1 switches to another domain and changes IP address, the connection to the mobile node MN2 can be maintained, i.e., persistent, and the packet transmission is not affected.

The following describes the operation of each element in the MAS module 403.

The connection splicer 403a is for maintaining the connection to the TCP connection of mobile nodes. The connection splicer 403a divides a TCP connection into two ends, with each for inbound and outbound TCP connection, respectively. The inbound end simulates the TCP/IP module dialogue of the mobile node MN2, and the outbound end simulates the TCP/IP module dialogue of the mobile node MN1. In other words, the connection splicer 403a is for inbound dialogue with TCP/IP module of the OS, and outbound dialogue with the mobile node MN2. Therefore, for mobile node MN1, the packets received from connection splicer 403a are the same as the packets received from TCP/IP module of the mobile node MN2, and for the mobile node MN2, the packets from connection splicer are the same as the packets received from TCP stack of the mobile node MN1.

According to the present invention, the connection splicer 403a includes two buffers. One buffer is for storing TCP packets received externally, called outer buffer. The other is for storing TCP packet transmitting externally, called inner buffer. When the connection splicer 403a receives the packets from TCP/IP module of the mobile node MN1, the connection splicer 403a places the packets into the inner buffer, and responds to the TCP/IP module of the mobile node MN1 with an acknowledgement so that the mobile node MN1 confirms that the mobile node MN2 has received the packets. The connection splicer 403a then transmits the packets in the inner buffer to the destination, i.e., mobile node MN2. When the buffer is nearly full, the connection splicer 403a uses a sliding window to slow down or stop the access point (AP) from sending more packets, similar to the conventional TCP connection.

Therefore, even when a mobile node is roaming or the network connection is terminated, the TCP of the OS in the mobile node will identify the target mobile is still staying alive, and will not affect the TCP connection. The connection splicer 403a must continuously probe the target mobile node or host in the TCP-keep-alive manner to wait for splicing the lost connection.

As the connection splicer 403a uses the conventional TCP connection for inbound and outbound ends, the connection can be established normally regardless whether the MAS module is installed on the target host.

The network address transformer 403b is responsible for transforming the HA and CoA. The network address transformer 403b is the last gate prior to the outbound packets transmitted externally, and the first gate for the received packets. In other words, the network address transformer 403b defines the part outside of network driver interface 402 as the external network, and the rest as the internal network. Unlike the conventional network address transformation, the network address transformer 403b maintains two IP mapping tables, with one for internal IP mapping table, called InnerNAT, and the other for external mapping table, called OuterNAT.

Figure 5:
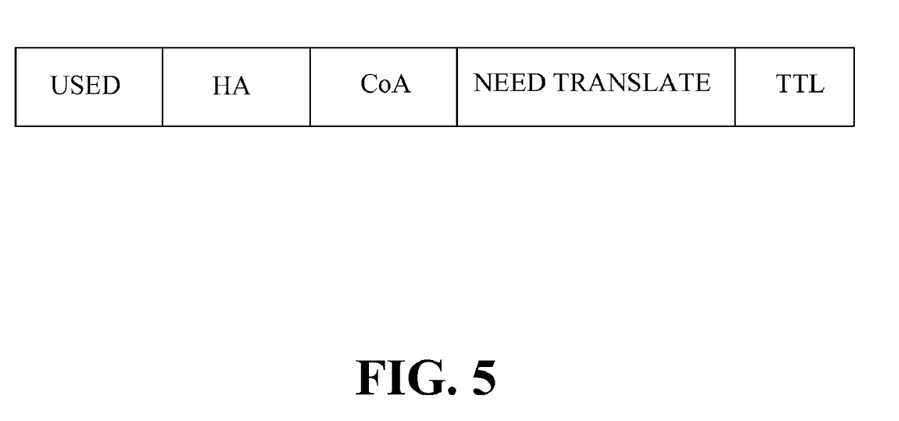
FIG. 5 shows a schematic view of the fields of a network address translation (NAT) record.

In the network address transformer 403b, each mobile node maps to a record in the Network Address Translation (NAT). FIG. 5 shows a schematic view of the fields of a NAT record. The fields of a NAT record include a used field, an HA field, a CoA field, a need translate field, and a time-to-live (TTL) field. An NAT record records at least the HA and CoA fields. If the HA is different from the CoA, it indicates the mobile node is no longer in the original domain, and has roamed to another domain. Therefore, the need translate field must be set and the addresses corresponding to the HA of the NAT record are translated to the CoA. Similarly, if the HA is the same as CoA of the NAT record, it indicates the mobile node stays in the original domain, and the need translate field is cleared.

The InnerNAT of the network address transformer 403b has only one NAT entry, for recording the HA of a mobile node and the CoA obtained from DHCP server for the mobile node. If the mobile node is in the home network, the CoA is the same as HA. Through the translation of the network address transformer 403b, the local mobile node only knows that the HA is its own IP. Therefore, all the applications use the HA for connection, regardless of the CoA. The OuterNAT includes a plurality of NAT entries. Each NAT entry records a mapping relation between the HA and the CoA of a target mobile node.

Figure 6:
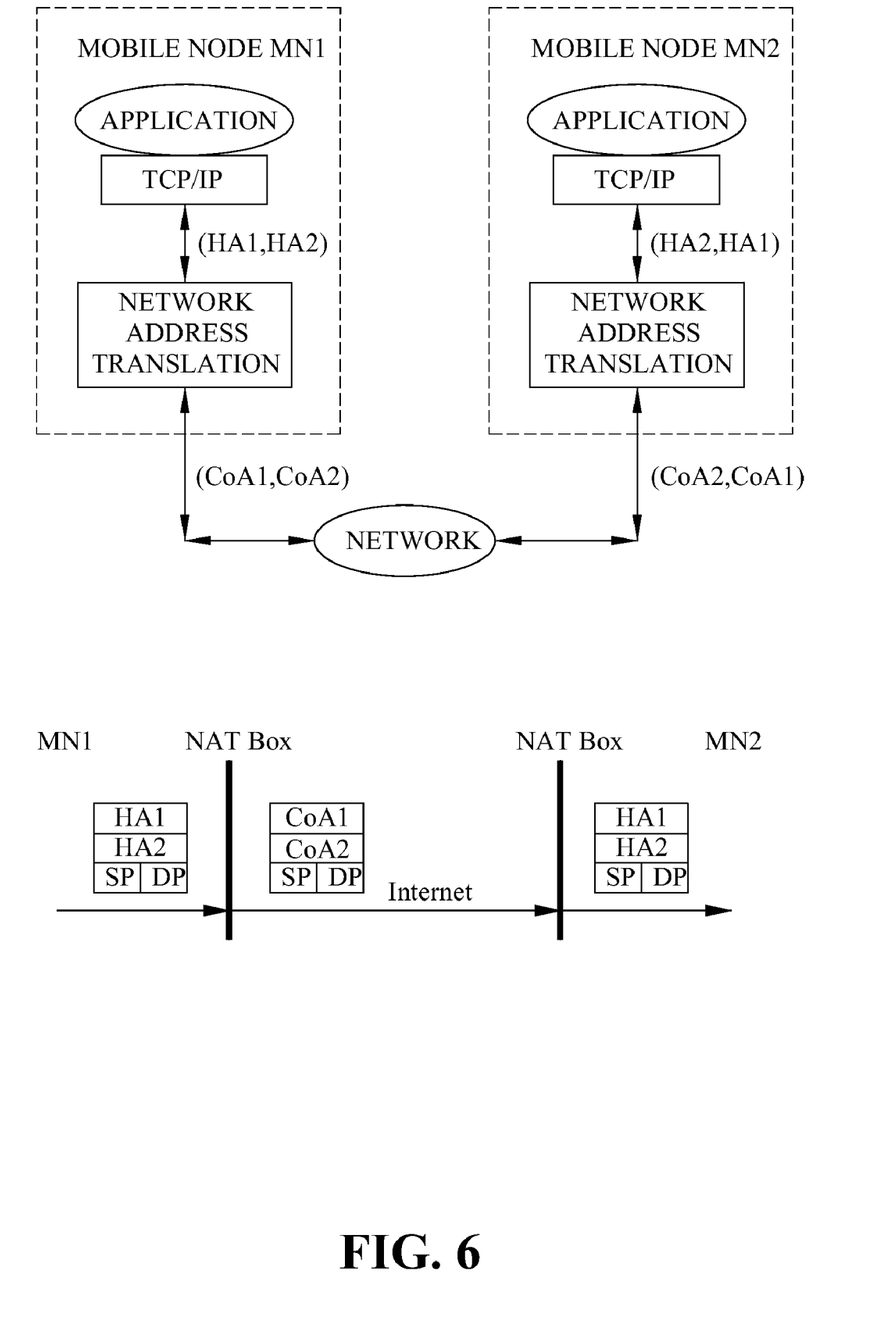
FIG. 6 illustrates the change of packet's content through a network address transformer by taking an example.

FIG. 6 illustrates the change of packet's content through the network address transformer 403b by taking an example.

The upper part of FIG. 6 shows that the HA1 and HA2 of mobile nodes MN1 and MN2 are translated by the network address transformer 403b to CoA1 and CoA2. Therefore, the mapping relation between HA2 and CoA2 of the mobile node MN2 can be obtained, and recorded in OuterNAT of the mobile node MN1. The mapping relation between HA2 and CoA2 of the mobile node MN2 can be obtained from the Session Description Protocol (SDP) information.

The lower part of FIG. 6 shows that the packet contents at mobile node MN1, i.e., HA1, HA2, SP, DP, are changed by the address translation of network address translation to CoA1, CoA2, SP and DP in DHCP, where SP is the source port, and DP is the destination port.

In this way, when the application of the mobile node MN1 transmits a packet to the mobile node MN2, the application uses HA1 for transmitting the packet, network address transformer 403b of the mobile node MN1 translates the HA1 and HA2 of the packet into CoA1 and CoA2, and the packet is then transmitted through the network to the mobile node MN2. Therefore, through the address translation of network address transformer 403b, the packets from the application on the mobile node MN1 can be transmitted successfully to the mobile node MN2 when the mobile node MN1 switches to another domain.

The mobility manager 403c is responsible for registering or updating the registration to MMS, and issuing INVITE or RE-INVITE messages. For the SIP-based network, the mobility manager 403c is responsible for processing the SIP and SDP information, and registering to the SIP proxy server at the beginning. The conventional SIP also has the MMS function. Whenever a mobile node switches domain and obtains a CoA, the mobility manager 403c must update the registration to the SIP proxy server.

The mobility manager 403c defines a unique Uniform Resource Locator (URL) for the HA of mobile node, and uses the URL to register to the SIP proxy server. The format of the URL is the combination of IP address of MN and the domain name to which the IP address belongs, such as HomeIP@SIPdomain.

Figure 7:
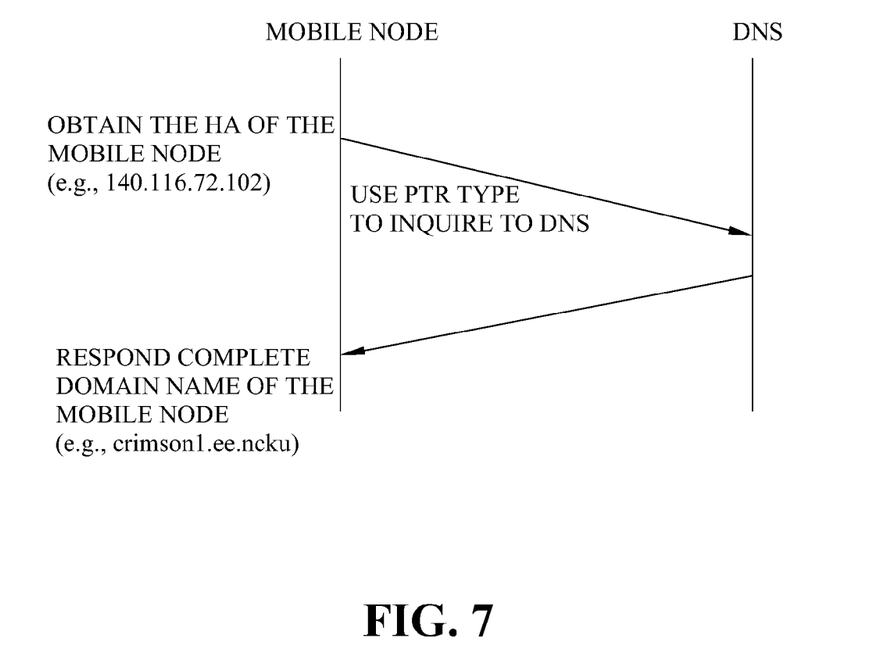
FIG. 7 shows how the mobility manager generates a uniform resource locator (URL) by taking an example.

FIG. 7 shows how the mobility manager generates an URL by taking an example. When a mobile node is connected to the network for the first time, the MAS module 403 of the mobile node must define the URL, and register to the SIP proxy server. The URL of the mobile node uses the HA of the mobile node as the user name, combined with the domain name.

As shown in FIG. 7, the first step is to obtain the HA of the mobile node, such as 140.116.72.102. Then, a PTR type is used to inquire to the Domain Name Server (DNS) of the complete domain name corresponding to the HA of the mobile node, and DNS responds with the complete domain name, such as crimson1.ee.ncku. Assuming that SIP domain and DNS domain are overlapped and the domain in the complete domain name of mobile node is the complete domain name removing the first label, the domain name to which the mobile node belongs can be translated to ee.ncku. By combining the HA (140.116.72.102) and the translated domain name (ee.ncku), the mobility manager 403c obtains the URL of the MN as 140.116.72.102@ee.ncku.

Figure 8:
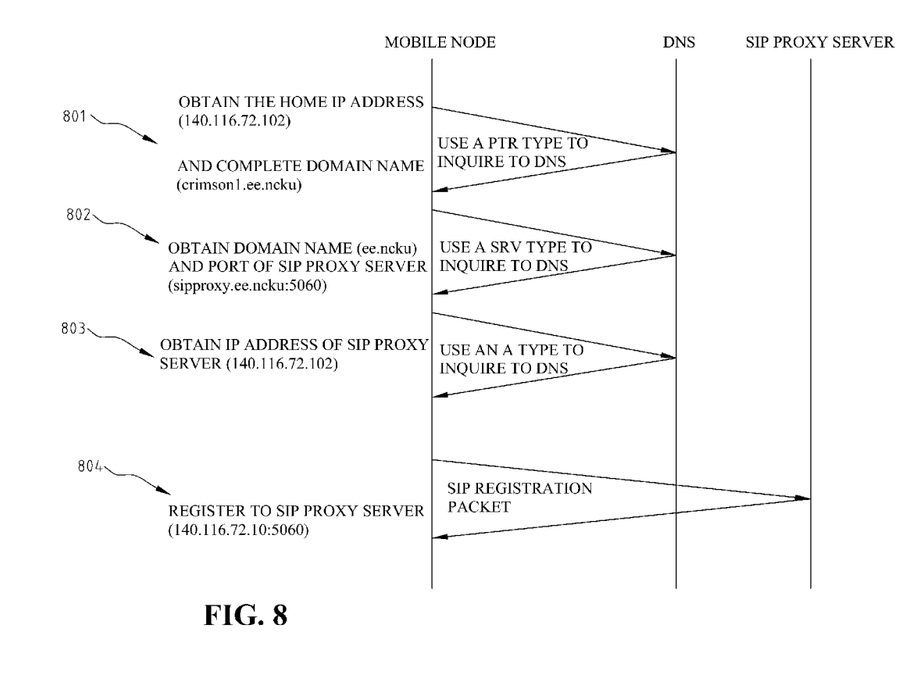
FIG. 8 shows a flowchart illustrating the flow of first time to register SIP proxy through the mobility manager.

FIG. 8 shows a flowchart illustrating the flow of first time to register SIP proxy through the mobility manager, including steps 801-804.

Step 801 is to obtain the HA of the mobile node and wait for the response of a complete domain name of the mobile node. As shown in FIG. 8, the HA of the mobile node is obtained, e.g., 140.116.72.102, and a PTR type is used to inquire DNS and DNS responds with a complete domain name of the MN, e.g., crimson1.ee.ncku.

Step 802 is to obtain the domain name and the port of the SIP proxy server of the domain where the mobile node is in. As shown in FIG. 8, the mobility manager 403c uses an SRV type to inquire DNS of the SIP proxy server address of the SIP domain where the mobile node is in, and the DNS responds with the domain name of the SIP proxy server address as ee.ncku, and the port as sipproxy.ee.ncku:5060.

Step 803 is to obtain the IP address of the SIP proxy server of the domain where the mobile node is in. As shown in FIG. 8, the mobility manager 403c uses an A type to inquire DNS, and DNS responds with an IP address of the SIP proxy server, 140.116.72.10. Therefore, the IP address and the port of the SIP proxy server is 140.116.72.10:5060.

After steps 801-803, the obtained domain name is ee.ncku, and the IP address and the port of the SIP proxy server are also obtained. Then, step 804 is executed.

Step 804 is to register to the SIP proxy server (140.116.72.10:5060). A SIP registration packet with URL 140.116.72.102@ee.ncku of the mobile node is sent to the SIP proxy server (140.116.72.10:5060). The mobility manager 403c also records the SIP proxy server information.

Then, the updating of the registration can be done directly to the SIP proxy server without repeating the steps of FIG. 8.

The method to obtain the URL of the target mobile node is the same as the method to obtain the URL of the local MN. When the local mobile node intends to connect to a target mobile node for the first time, the MAS module will use the target IP to inquire DNS of the complete domain name of the target mobile node, and then issues an INVITE message. After processing the SIP protocol information, the MAS module records the URL of the SIP corresponding to the IP of the target mobile node, and directly issues an INVITE to the SIP URL when in the state of RE-INVITE.

Figure 9:
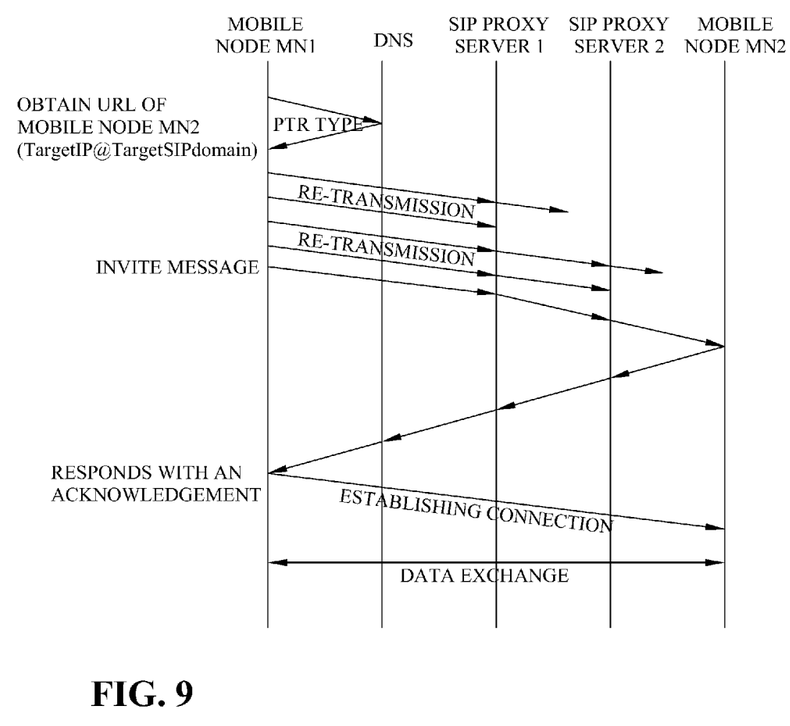
FIG. 9 shows how a mobile node first time connects to a target mobile node.

FIG. 9 shows how a mobile node (say NM1) first time connects to a target mobile node (say NM2). As shown in FIG. 9, the MAS module of the mobile node MN1 uses the IP of the mobile node MN2 to inquire DNS of the complete domain name of the target mobile node MN2, and then issues an INVITE message. If the target mobile node MN2 responds with an acknowledgement, the mobile node MN1 and the target mobile node MN2 can establish a connection and exchange data.

After the SIP transaction processing, the MAS module records the SIP URL (TargetIP@TargetSIPdomain) corresponding to the IP of the target node MN2, and issues INVITE directly to the SIP URL when in the state of RE-INVITE. Similarly, the mobility manager 403c records the mobile node MN2 information so that the updating of registration can be done directly to the SIP proxy server without repeating the above steps when the mobility manager 403c of the mobile node MN1 is required to update the registration.

To prevent packet loss caused by network instability, the mobility manager 403c of the MAS module has a re-transmission mechanism for the process of finding the URL. However, when the re-transmission exceeds a certain limit, and none of the re-transmission step is successful, the MAS module will determine that the target mobile node does not support the MAS module and decide to abandon the data exchange.

The handoff detector 403d is responsible for detecting whether a mobile node switches to another domain. As described earlier, when the mobile node MN1 roams from domain A to domain B and obtains a new IP as CoA, the handoff detector 403d detects the domain switching of the mobile node MN1, and issues a domain handoff message to the mobility manager 403c.

In summary, the present invention provides a solution to the persistent connection for Internet applications operating in a wireless network. Through the apparatus and method of mobility management for persistent connections of the present invention, the application on the mobile node can maintain persistent connection when the mobile node roams to a different domain.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus of mobility management for persistent connections, applicable to a wireless network environment, said wireless network environment having a plurality of mobile nodes located in a plurality of network domains, said apparatus comprising:
   a plurality of mobility management servers (MMSs), for communicating with said plurality of mobile nodes; and
   a plurality of Mobility-Aware Socket (MAS) modules for providing persistent connection between mobile nodes, each of said MAS modules belonging to one of said plurality of mobile nodes and comprising a connection splicer for splicing connection between mobile nodes and a network address transformer for network address transformation;
   wherein when a first mobile node switches from a first network domain to a second network domain, said first mobile node and a target mobile node connected to said first mobile node transmit and receive packets to and from each other directly through the network address transformation of a home address (HA) of said first mobile node and a care-of-address (CoA) obtained from said second network domain in the MAS module of said first mobile node without going through said MMSs, and the MAS module of said first mobile node splices connection to said target mobile node to provide persistent connection between said first and target mobile.

2. The apparatus as claimed in claim 1, wherein each of said plurality of mobile nodes is one of notebook, personal computer, mobile phone, and personal digital assistant.

3. The apparatus as claimed in claim 1, wherein said plurality of MMSs are realized by a plurality of servers.

4. The apparatus as claimed in claim 1, wherein each of said MAS modules further includes a mobility manager and a handoff detector.

5. The apparatus as claimed in claim 1, wherein said connection splicer is responsible for maintaining persistent connection of transfer control protocol (TCP) of a corresponding mobile node.

6. The apparatus as claimed in claim 1, wherein said network address transformer is responsible for the translation of a home address (HA) and a care-of-address (CoA) of a corresponding mobile node.

7. The apparatus as claimed in claim 4, wherein said mobility manager is responsible for registering to or updating registration to said plurality of MMSs, and issuing one or more invitation or re-invitation messages.

8. The apparatus as claimed in claim 4, wherein said handoff detector is responsible for detecting if a corresponding mobile node switches to a different network domain.

9. The apparatus as claimed in claim 1, wherein state changes of said MAS module correspond to a finite state machine, said finite state machine including the state changes from NON-CONNECTION to INVITE, from INVITE to INVITE-SUCCESS, from INVITE to INVITE-FAILURE, from INVITE-SUCCESS to RE-INVITE, from RE-INVITE to INVITE-SUCCESS, from RE-INVITE to INVITE-FAILURE, and from INVITE-FAILURE to INVITE-SUCCESS.

10. A method of mobility management for persistent connections, applicable to a wireless network environment, said wireless network environment having a plurality of mobile nodes located in a plurality of network domains, and a plurality of mobility management servers (MMSs), each mobile node having a Mobility-Aware Socket (MAS) module which comprises a connection splicer for splicing connection between mobile nodes and a network address transformer for network address transformation, said method comprising the steps of:
  executing the MAS module of a first mobile node and the MAS module of a target mobile node;
  registering said first mobile node in a first network domain to a first MMS and registering said target mobile node to a target MMS;
  issuing an invitation (INVITE) message from said first mobile node to said target mobile node, and responding with an acknowledgement from said target mobile node to said first mobile node;
  establishing connection between said first mobile node and said target mobile node;
  updating the registration of said first mobile node to said first MMS when said first mobile node switches from said first network domain to a second network domain;
  issuing a re-invitation (RE-INVITE) message from said first mobile node to said target mobile node, and responding with an acknowledgement from said target mobile node to said first mobile node; and
  splicing said connection between said first mobile node and said target mobile node;
  wherein when said first mobile node switches from said first network domain to said second network domain, said first mobile node and said target mobile node transmit and receive packets to and from each other directly through the network address transformation of a home address (HA) of said first mobile node and a care-of-address (CoA) obtained from said second network domain in the MAS module of said first mobile node without going through said MMSs, and the MAS module of said first mobile node splices connection to said target mobile node to provide persistent connection between said first and target mobile nodes.

11. The method as claimed in claim 10, wherein in said registering step, one of said plurality of mobile nodes first time registering to a corresponding MMS further includes the steps of:
  obtaining an internet protocol (IP) address of the mobile node and waiting for a response with a complete domain name of the mobile node;
  inquiring an IP address of the corresponding MMS of the network domain where the mobile node is located, then waiting for a response; and
  issuing a registration packet to register to the corresponding MMS.

12. The method as claimed in claim 10, wherein said updating registration step uses uniform resource locators (URLs) corresponding to said first mobile node and said target mobile node to register to said first MMS and said target MMS respectively.

13. The method as claimed in claim 12, wherein the uniform resource locator of a mobile node is a combination of an IP address of the mobile node and a domain name to which the mobile node belongs.

14. The method as claimed in claim 13, wherein said domain name is obtained by removing a first label from a complete domain name, said complete domain name is a response from a domain name server (DNS), and is corresponding to the IP address of the mobile node.

15. The method as claimed in claim 10, wherein in said splicing step, said first mobile node and said target mobile node connect for a first time further includes the steps of:
  inquiring to a domain name server (DNS) with an IP address of said target mobile node, and obtaining a complete domain name of said target mobile node;
  issuing said INVITE message from said first mobile node to said target mobile node and waiting for response; and
  after receiving an acknowledgement from said target mobile node, establishing connection between said first mobile node and said target mobile node.

16. The method as claimed in claim 10, wherein said step of issuing said invitation message uses a uniform resource locator of said target mobile node to issue said invitation message to said target mobile node.

17. The method as claimed in claim 10, wherein said step of issuing said re-invitation message uses a uniform resource locator of said target mobile node to issue said re-invitation message to said target mobile node.

18. The method as claimed in claim 10, wherein in said updating registration step, said first mobile node obtains a new IP address as a care-of-address (CoA) from another dynamic host configuration protocol (DHCP), and updates said registration to said first MMS.

* * * * *